(12) United States Patent
Mier

(10) Patent No.: US 6,393,810 B1
(45) Date of Patent: May 28, 2002

(54) HORSE LEG PROTECTION SYSTEM

(76) Inventor: Robin S. Mier, 32 County Line Rd., Edgewood, NM (US) 87015

( * ) Notice: Subject to any disclaimer, the term of this patent is extended or adjusted under 35 U.S.C. 154(b) by 0 days.

(21) Appl. No.: 09/518,565

(22) Filed: Mar. 3, 2000

(51) Int. Cl.[7] ................................. B68C 5/00
(52) U.S. Cl. ................................. 54/82; 168/1
(58) Field of Search ............... 54/79.1, 82; 119/850; 168/1, 3

(56) References Cited

U.S. PATENT DOCUMENTS

| | | | |
|---|---|---|---|
| 1,434,275 A | * 10/1922 | Wozny | ............ 168/1 |
| 2,937,487 A | 5/1960 | Dever | ............ 54/32 |
| 3,742,679 A | * 7/1973 | Jordan | ............ 119/850 X |
| 4,470,411 A | 9/1984 | Hoyt, Jr. | ............ 128/165 |
| 4,510,888 A | 4/1985 | DeAngelis et al. | |
| 5,408,812 A | * 4/1995 | Stark | ............ 54/82 |
| 5,441,015 A | 8/1995 | Farley | ............ 602/28 |
| 5,528,885 A | 6/1996 | Chamberlain | ............ 54/32 |
| 5,588,288 A | 12/1996 | Origgi et al. | ............ 54/82 |

FOREIGN PATENT DOCUMENTS

GB 240385 * 10/1925 ............ 54/82

* cited by examiner

*Primary Examiner*—Robert P. Swiatek
(74) *Attorney, Agent, or Firm*—Joseph N. Breaux

(57) ABSTRACT

A horse leg protection system that includes a stretchable sock that is stretched over the lower leg of a horse and attached to a hoof protecting boot of the system to provide a barrier between the horse's leg and hoof and possible contaminants.

1 Claim, 1 Drawing Sheet

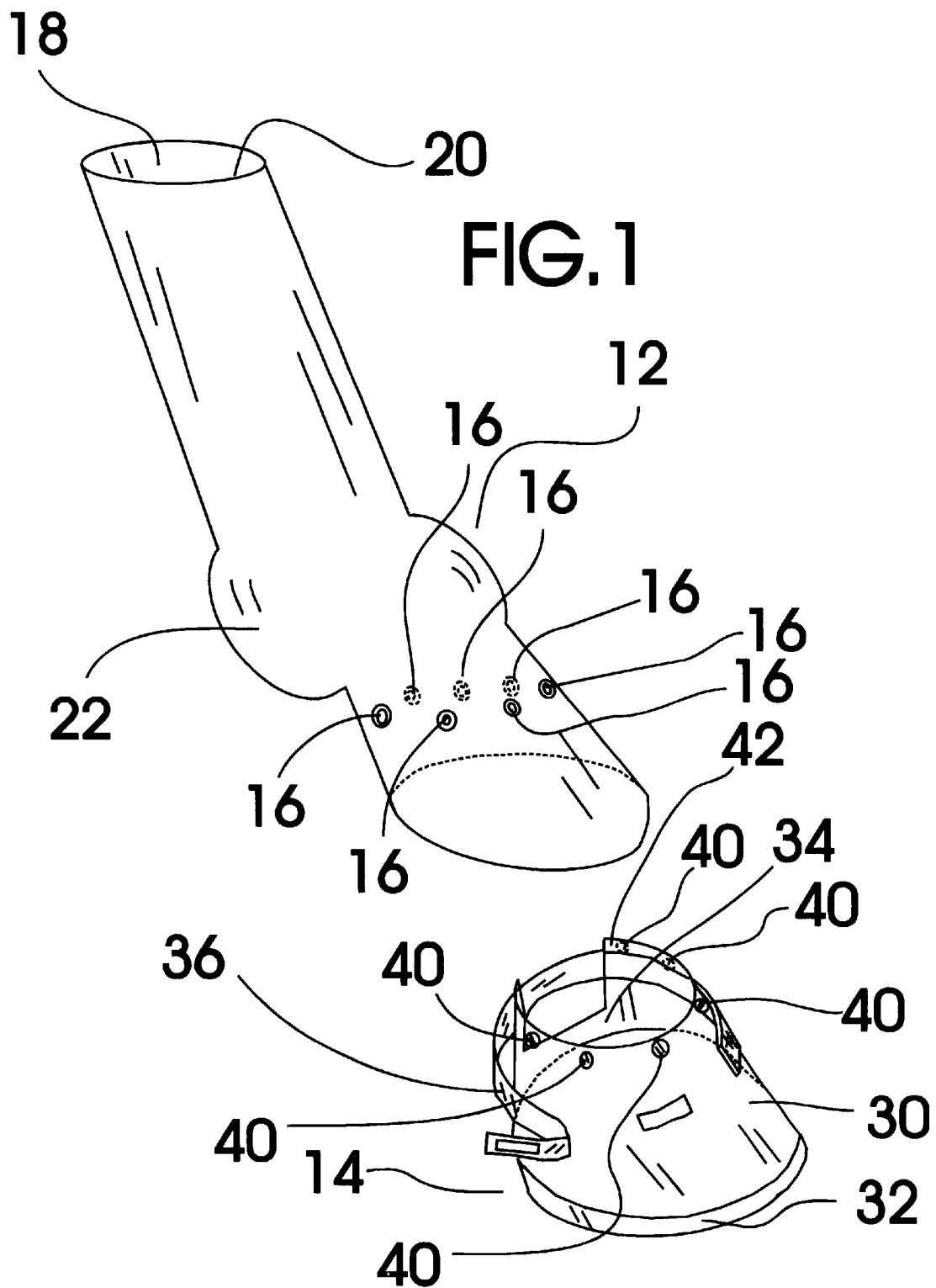

HORSE LEG PROTECTION SYSTEM

TECHNICAL FIELD

The present invention relates to horse care products and more particularly to a horse leg protection system that includes an elastic, leg-conforming sock member and a slip-on hoof boot; the elastic, leg-conforming sock member being constructed from an elastomeric material and having a number of sock fastener members positioned therearound; the slip-on hoof boot having an upper portion constructed from plastic and a sole portion constructed from a non-slip rubber; the upper portion defining a hoof receiving cavity and having a boot securing strap provide thereon for partially encircling the upper portion and securing the slip-on hoof boot onto the hoof of a horse and a number of boot fastener members provided around a top perimeter edge of the upper portion that are companionate with the sock fastener members; the sock fastener members being positioned on an area of the elastomeric, leg-conforming sock member such that, when the elastomeric, leg-conforming sock member is slipped over the hoof and onto the leg of a horse, the sock fastener members are positioned in alignment with the boot fastener members; the elastomeric, leg-conforming sock member having an expanded fetlock receiving area positioned adjacent to the sock fastener members for receiving the fetlock of a horse leg.

BACKGROUND ART

Horse often have injuries to the legs that must be bandaged to prevent infection and insect infestation. It would be a benefit to people caring for horses to have a horse leg protection system that included a stretchable sock that could be stretched over the lower leg of a horse and attached to a hoof protecting boot to provide a barrier between the horse's leg and hoof and possible contaminants.

GENERAL SUMMARY DISCUSSION OF INVENTION

It is thus an object of the invention to provide a horse leg protection system that includes an elastic, leg-conforming sock member and a slip-on hoof boor; the elastic, leg-conforming sock member being constructed from an elastomeric material and having a member of sock fastener members positioned therearound; the slip-on hoof boot having an upper portion constructed from plastic and a sole portion constructed from a non-slip rubber; the upper portion defining a hoof receiving cavity and having a boot securing strap provided thereon for partially encircling the upper portion and securing the slip-on hoof boot onto the hoof of a horse and a number of boot fastener members provided around a top perimeter edge of the upper portion that are companionate with the sock fastener members; the sock fastener members being positioned on an area of the elastomeric, leg-conforming sock member such that, when the elastomeric, leg-conforming sock member is slipped over the hoof and onto the leg of a horse, the sock fastener members are positioned in alignment with the boot fastener members; the elastomeric, leg-conforming sock member having an expanded fetlock receiving area positioned adjacent to the sock fastener members for receiving the fetlock of a horse leg.

Accordingly, a horse leg protection system is provided. The horse leg protection system includes an elastic, leg-conforming sock member and a slip-on hoof boot; the elastic, leg-conforming sock member being constructed from an elastomeric material and having a number of sock fastener members positioned therearound; the slip-on hoof boot having an upper portion constructed from plastic and a sole portion constructed from a non-slip rubber; the upper portion defining a hoof receiving cavity and having a boot securing strap provided thereon for partially encircling the upper portion and securing the slip-on hoof boot onto the hoof of a horse and a number of boot fastener members provided around a top perimeter edge of the upper portion that are companionate with the sock fastener members; the sock fastener members being positioned on an area of the elastomeric, leg-conforming sock member such that, when the elastomeric, leg-conforming sock member is slipped over the hoof and onto the leg of a horse, the sock fastener members are positioned in alignment with the boot fastener members; the elastomeric, leg-conforming sock member having an expanded fetlock receiving area positioned adjacent to the sock fastener members for receiving the fetlock of a horse leg.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is an explode perspective view of an exemplary embodiment of the horse leg protection system of the present invention showing the elastic, leg-conforming sock member and the slip-on hoof boot; the elastic, leg-conforming sock member being constructed from an elastomeric material and having a number of sock fastener members positioned therearound; the slip-on hoof boot having an upper portion constructed from plastic and a sole portion constructed from a non-slip rubber; the upper portion defining a hoof receiving cavity and having a boot securing strap provided thereon for partially encircling the upper portion and securing the slip-on hoof boot onto the hoof of a horse and a number of boot fastener members provided around a top perimeter edge of the upper portion that are companionate with the sock fastener members; the sock fastener members being positioned on an area of the elastomeric, leg-conforming sock member such that, when the elastomeric, leg-conforming sock member is slipped over the hoof and onto the leg of a horse, the sock fastener members are positioned in alignment with the boot fastener members; the elastomeric, leg-conforming sock member having an expanded fetlock receiving area positioned adjacent to the sock fastener members for receiving the fetlock of a horse leg.

EXEMPLARY MODE FOR CARRYING OUT THE INVENTION

FIG. 1 shows an exemplary embodiment of the horse leg protection system of the present invention generally designated 10. Horse leg protection system 10 includes an elastic, leg-conforming sock member, generally designated 12, and a slip-on hoof boot, generally designated 14.

Elastic, leg-conforming sock member 12 is constructed from an elastomeric fabric such as spandex. Elastic leg-conforming sock member 12 has a hoof insertion opening 28 in connection with a leg receiving cavity 20 formed within sock member 12 and through which the hoof of the horse is inserted when sock member 12 is put on the leg of a horse. A number of sock snap fastner members 16 are positioned around the exterior of sock member 12 just below an expanded fetlock receiving area 22 of sock member 12.

Slip-on hoof boot 14 has an upper portion, generally designated 30, constructed from plastic and a sole portion, generally designated 32, constructed from a non-slip rubber. Upper portion 30 defines a hoof receiving cavity 34 into which the hoof of the horse is slipped once sock member 12 is in place. Upper portion 30 also includes a boot securing strap 36 that is used to secure the hoof of the horse within hoof receiving cavity 34 and a number of boot snap fastener members 40 provided around a top perimeter edge 42 of upper portion 30 that are compassionate with the sock snap fastener members 16. Sock snap fastener members 16 are positioned on sock member 12 such that, when sock member 12 is slipped over the hoof and onto the leg of a horse, the sock snap fastener members 16 are positioned in alignment with the boot snap fastener members 40. Sock member 12 can also be sized to accommodate ice packs and other items between the leg of the horse.

It can be seen from the preceding description that a horse leg protection system has been provided.

It is noted that the embodiment of the horse leg protection system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:
1. A horse leg protection system for covering the leg of horse, said horse leg protection system comprising:
   an elastic, leg-conforming sock member; and
   a slip-on hoof boot;
   said elastic, leg-conforming sock member being constructed from an elastomeric material and having a number of sock fastener members positioned therearound;
   said slip-on hoof boot having an upper portion constructed from plastic and a sole portion constructed from a non-slip rubber;
   said upper portion defining a hoof receiving cavity and having a boot securing strap provided thereon for partially encircling said upper portion and securing said slip-on hoof boot onto said hoof of a horse and a number of boot fastener members provided around a top perimeter edge of said upper portion that are companionate with said sock fastener members;
   said sock fastener members being positioned on an area of said elastomeric, leg-conforming sock member such that, when said elastomeric, leg-conforming sock member is slipped over said hoof and onto said leg of a horse, said sock fastener members are positioned in alignment with said boot fastener members;
   said elastomeric, leg-conforming sock member having an expanded fetlock receiving area positioned adjacent to said sock fastener members for receiving said fetlock of a horse leg.

* * * * *